United States Patent [19]

Jennings, Jr.

[11] Patent Number: 4,750,562
[45] Date of Patent: Jun. 14, 1988

[54] METHOD TO DIVERT FRACTURES INDUCED BY HIGH IMPULSE FRACTURING

[75] Inventor: Alfred R. Jennings, Jr., Plano, Tex.

[73] Assignee: Mobil Oil Corporation, New York, N.Y.

[21] Appl. No.: 941,546

[22] Filed: Dec. 11, 1986

Related U.S. Application Data

[63] Continuation of Ser. No. 770,927, Aug. 30, 1985, abandoned.

[51] Int. Cl.⁴ .................. E21B 33/138; E21B 43/263
[52] U.S. Cl. .................................. 166/281; 166/294; 166/299; 166/308
[58] Field of Search ............... 166/281, 294, 295, 299, 166/300, 308

[56] References Cited

U.S. PATENT DOCUMENTS

| | | | |
|---|---|---|---|
| 2,122,452 | 7/1938 | Clason | 166/281 |
| 2,681,704 | 6/1954 | Menaul | 166/281 |
| 2,838,117 | 6/1958 | Clark, Jr. et al. | 166/308 X |
| 2,970,645 | 2/1961 | Glass | 166/281 |
| 2,978,025 | 4/1961 | Clark, Jr. | 166/281 X |
| 3,227,212 | 1/1966 | Black et al. | 166/294 |
| 3,289,762 | 12/1966 | Schell et al. | 166/281 |
| 3,615,794 | 10/1971 | Nimerick | 166/294 X |
| 3,630,279 | 12/1971 | Fast et al. | 166/281 |
| 4,039,030 | 8/1977 | Godfrey et al. | 166/299 |
| 4,157,116 | 6/1979 | Coulter | 166/281 X |
| 4,378,049 | 3/1983 | Hsu et al. | 166/294 X |
| 4,502,967 | 3/1985 | Conway | 166/308 X |
| 4,541,485 | 9/1985 | Block | 166/281 |
| 4,634,187 | 1/1987 | Huff et al. | 166/281 X |

Primary Examiner—George A. Suchfield
Attorney, Agent, or Firm—Alexander J. McKillop; Michael G. Gilman; Charles A. Malone

[57] ABSTRACT

A method for effecting high impulse fracturing in a stratified formation penetrated by a well where multiple fractures are first induced in a lower zone. Thereafter, said fractures and the well area within and adjacent said lower zone are filled with a gel mixture which solidifies. A gel plug is thus formed in said lower zone. High impulse fracturing is instituted in a higher zone which is filled with a gel mixture similarly as in said lower zone. High impulse fracturing and forming a solid gel within the induced fractures and area within the well adjacent the fractured zone are continued until each desired zone has been fractured. The gel plug prevents high impulse energy from entering fractures of previously fractured zones resulting in deeper fracture penetration.

30 Claims, 1 Drawing Sheet

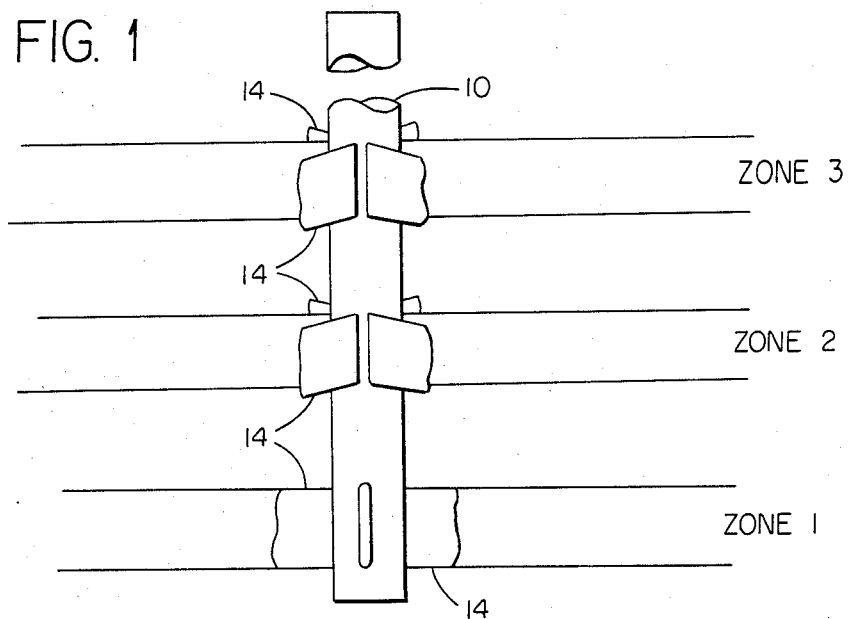
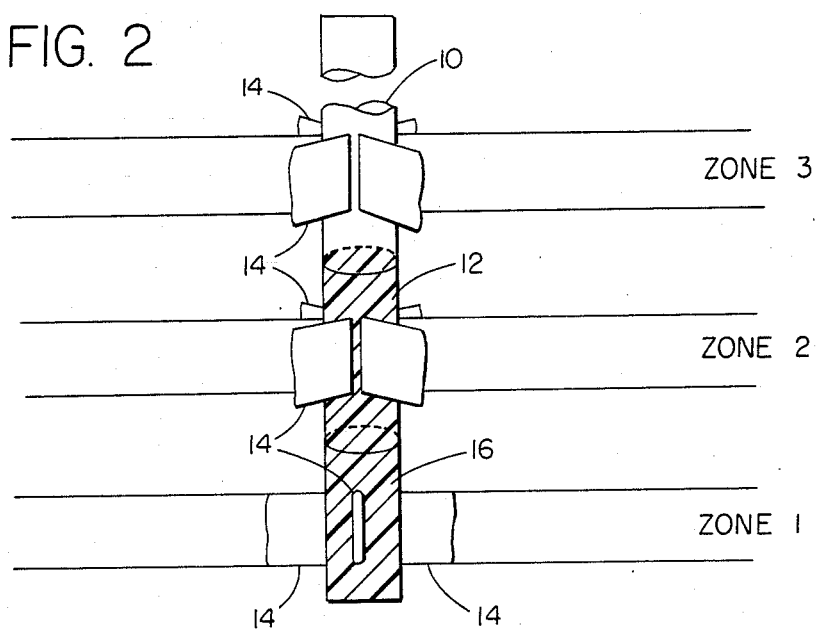

4,750,562

METHOD TO DIVERT FRACTURES INDUCED BY HIGH IMPULSE FRACTURING

This is a continuation of copending application Ser. No. 770,927, filed on Aug. 30, 1985, now abandoned.

FIELD OF THE INVENTION

This invention is directed to a method for increasing the effectiveness of high impulse fracturing in stratified formations.

BACKGROUND OF THE INVENTION

As interest grows in the application of high impulse fracturing, types and variations in zones and zone thickness will also increase. Presently, it is possible to modify the detonation device in high impulse fracturing to cover extensive zone thicknesses. However, with repeated runs, the initial fractures induced by high impulse fracturing remain open to absorb large amounts of energy from subsequent fracturing stages. Remaining open fractures thus lessen the effects of high impulse fracturing in the shallower zones.

Therefore, what is needed is a method which will prevent the absorption of energy in previously fractured zones during high impulse fracturing.

SUMMARY OF THE INVENTION

This invention is directed to a method for inducing multiple fractures into multiple zones of a formation which is penetrated by a well extending down through said formation. Multiple fractures are induced into the lower zone of said formation by high impulse or controlled pulse fracturing. A solidifiable gel material is then placed into the lower zone containing said multiple fracture. Subsequently, the gel solidifies and fills said fratures while forming a solidified gel within said fractures and a solidified gel plug within the well adjacent said well. Said solidified gel absorbs substantial amounts of energy from subsequent high energy impulse fracturing in upper zones of said formation. This lessens the effects of losing energy from subsequent high impulse fracturing into the lower zone(s) already containing multiple fractures.

After said gel has solidified in the lower zone, high energy impulse fracturing is induced in a second zone above the lower first zone containing the solidified gel plug. Next, the fractures induced by the second high impulse fracturing are filled by placing a solidifiable gel material within the well on top of the solidified gel plug in the lower zone. When the gel sloidifies, multiple fractures induced in said second zone are filled while forming a gel plug in the well adjacent said second zone. The second gel plug becomes an integral part of said first gel plug. This process of inducing multiple fractures into the next higher zone and filling the fractures with a solidified gel while forming a gel plug within the well continues until each desired zone has been fractured to the extent desired.

After fracturing the last desired zone, the solidified gel can be liquefied by placing acid within the well, or by incorporating a gel breaker with said solidifiable gel material prior to solidification of said gel.

It is therefore an object of this invention to increase the efficiency of high impulse fracturing when fracturing multiple zones in a formation.

It is another object of this invention to prevent high impulse fracturing energy directed to an upper zone from being dissipated into a lower zone of the formation.

It is a further object of this invention to produce increased yields of hydrocarbonaceous fluids from formations containing same.

It is a yet further object of this invention to provide an easily removable energy absorber in a well containing multiple zones where each separate zone is subjected to individual high impulse fracturing.

It is a still further object of this invention to obtain uniform penetration in each zone when a formation containing multiple zones is subjected to repeated high energy fracturing, separately in each zone.

BRIEF DESCRIPTION OF THE DRAWING

FIG. 1 is a schematic representation of stratified zones which have been subjected to high impulse fracturing without the benefit of solidified gel mixtures in the well and induced fractures.

FIG. 2 is a schematic representation of stratified zones which have been subjected to high impulse fracturing with the benefit of solidified gel mixtures in the well and induced fractures.

DESCRIPTION OF THE PREFERRED EMBODIMENTS

In the practice of this invention, a propellant sufficient to induce multiple fractures is placed into the lower zone of a stratified formation. The stratified formation is shown as zones 1, 2 and 3 in FIGS. 1 and 2. When said propellant is ignited, multiple radial fractures 14 are induced as shown in zone 1 of FIGS. 1 and 2. Godfrey et al. in U.S. Pat. No. 4,039,030 disclose a method for inducing multiple radial fractures in a formation by use of a propellant. This patent is hereby incorporated by reference. After inducing said fractures in zone 1, as shown in FIG. 1, a solidifiable gel material is injected or pumped into zone 1 where it enters the induced fractures 14 and flows to a level above zone 1. Upon solidification, said gel mixutre forms a solid mass within said multiple fractures. It also forms a gel plug 16 in zone 1, as shown in FIG. 2.

Thereafter, another propellant (not shown) sufficient to induce multiple fractures by high impulse fracturing is placed into an area adjacent to zone 2 as is shown in FIG. 2. After ignition of the propellant, a solidifiable gel mixture is injected into well 10 where it settles on top of solid gel plug 16. The gel enters multiple fractures 14 in zone 2 and flows to a level above said fractures and into well 10 adjacent zone 2. Said gel forms a solid mass in fractures 12 and a solid gel plug 12 as shown in FIG. 2. This procedure of inducing multiple fractures, filling the fractures with a solid gel and forming a solid gel plug within the well is repeated in order to fracture as many zones in the formation as is desired. The beneficial results of using this method is demonstrated in FIG. 2 which depicts the uniformity of multiple fracturing in each of the stratified zones within the formation. Without the benefit of this method, penetration of the fractures into each stratified zone diminishes as shown in FIG. 1, as the fracturing process moves from the lower to the higher zones.

After inducing fractures into as many zones as desired in the stratified formation, said gel and gel plugs can be removed by placing a solution of mineral acid into well 10. As is preferred, a solution of hydrochloric acid of about 7.5 to about 15.0 volume percent is capable of removing said gel. As will be discussed later, chemicals can be incorporated into the solidifiable gel mixture to break down said gel. Once the solid gel is removed, hydrocarbonaceous fluids may be produced from the well if said formation contains hydrocarbons. As will be understood by those skilled in the art, this method may be used to fracture mineral bearing formations, e.g. copper, iron, and aluminum.

According to the invention in its broadest aspect, a method is provided in high impulse fracturing for sealing multiple induced fractures and for closing off areas within a wellbore, subsequent to high impulse fracturing. After solidification, said solid gel is removed.

According to a preferred embodiment of the invention a solid nonreactant composition is added to the pumpable gel mixture in an amount sufficient to increase the density of the pumpable gel, whereby within a time of up to 4 hours said gel mixture becomes a solid gel plug of sufficient density to withstand the energy released from said propellant means, when ignited, at a temperature of up to greater than 538° C. (1,000° F.) and a pressure of 551,682 kPa (80,000 psig), and said gel plug is adapted to be easily broken down, liquefied and removed from the wellbore with little or no damage to the wellbore and formation.

As mentioned above, a pumpable gel mixture is placed into the wellbore and fractures by pumping the gel mixture before solidification by pump means (not shown). After preferably from about 2 hours to about 4 hours, the pumpable gel mixture solidifies. As will be understood by those skilled in the art, the composition of the mixture can be varied to obtain the desired rigidity in the gel. One method of making a suitable pumpable mixture is disclosed in U.S. Pat. No. 4,333,461 issued to Muller on June 8, 1982. This patent is hereby incorporated by reference. The stability and rigidity of the solidified gel depends upon the physical and chemical characteristics of the gel which characteristics are selected so that the gel plug is of a stablity and rigidity adapted to absorb the shock from ignition of the propellant. Generally these pressures generated upon ignition will vary from about 69,049 kPa to about 551,682 kPa (10,000 psig to 80,000 psig). Instantaneous heat generated upon ignition of the propellant may be greater than about 538° C. (1,000° F.) in the vicinity of the deflagration but is quickly dissipated with propagation.

Often, depending upon the kind of propellant used, it will be necessary to increase the density of the pumpable gel to obtain a gel plug having the desired stability and rigidity to absorb the generated energy. To accomplish this any solid non-reacting solid material may be added to the pumpable gel mixture. Preferred non-reacting solid materials include solid rock salt, or naturally occurring sodium chloride, calcium carbonate, and suitably crushed mollusk shells, such as oyster shells.

Other gel mixtures are used to obtain a solidified gel having the desired stability and rigidity. A preferred gel mixture which is used to obtain the desired stability and rigidity, for example, is a mixture of water and hydropropyl guar gum cross-linked with transitional metals and ions thereof. The purpose of the transitional metal ions is to provide increased strength, stability and rigidity for the solidified gel.

Hydropropyl guar gum is placed into water to form a fluid gel mixture, preferably in an amount of from about 0.70. to about 10.0 weight percent of said mixture. In a particularly preferred embodiment, hydropropyl guar gum is used to form said mixture in an amount of about 7.2 percent by weight of said gel mixture.

Metallic ions are also used in the pumpable gel mixture and include titanium, zirconium, chromium, antimony and aluminum. The concentration of these transitional metals in the pumpable gel fluid will vary depending upon the requirements for the particular propellant being used and the nature of the wellbore and formation into which a canister containing the propellant is place. Although the exact amounts of the metals required will vary depending on the particular application, the metals should be included within the pumpable gel fluid mixture in amounts of from about 0.005 weight percent to about 0.50 weight percent, preferably about 0.01 weight percent of said pumpable gel fluid mixture.

There are several methods of preparing the types of polymer systems which are used to obtain the solidified gel described herein. The ranges of polymer, buffer, and crosslinker concentrations given encompass two primary methods of forming the gel plugs.

The first method involves using guar gum or hydroxypropyl guar as the base polymer. These products are widely used in the petroleum and food industries and are commerically available from chemical suppliers such as Celanese, Henkel, Hercules, and Millmaster Onyx. For this method, base gel containing the described concentration of about 40 lbs per 1000 gallons of water (several types of water such as about 2% KCl water, city water, formation water, etc. are used) is mixed into a holding tank at the surface (500 bbl frac tank, for example). The purpose of the base gel is to suspend additional unhydrated guar or hydroxypropyl guar (up to about 600 or so lbs/1000 gals) added as the fluid system is pumped into the wellbore. The "secondary" polymer is pre-treated by the supplier with glyoxal or similar material to retard hydration. A buffer (such as sodium acetate or sodium pyrophosphate) is added with the additional polymer to maintain a fluid pH value sufficient to hydrate the additional polymer. The hydration of the additional material occurs slowly enough to allow placement of the solidifiable material into the wellbore. The buffers and gelling agents are readily availabe from the various service companies. In recent years improvements in fluid chemistry have led to "one bag" systems which contain all the described dry additives in one container. Comparable gel plugs can be prepared using hydroxyethyl cellulose (HEC) in the described manner using the primary and secondary polymer approach. HEC is available from Hercules and Henkel.

The second method involves the use of much lower polymer concentrations (about 60 to about 100 lbs/1000 gals of water) where viscosity and stability characteristics have been greatly enhanced by crosslinking with solutions of metallic salts. Because of the molecular structure, guar and derivatized guar (hydroxypropyl guar) lend themselves more satisfactorily to crosslinking than HEC. Therefore, the crosslinked guars are most useful in the present invention. The base gel in this instance would consist of the guar in solution at the described concentrations. Buffers are then used, depending on the crosslinker, to maintain a fluid pH necessary for the crosslink reaction. Several methods have been developed and are known in the prior art as has been suggested herein.

For the guar or hydroxypropyl guar crosslinked with borate, sodium pyrophosphate is used as the buffer, for example, and sodium tetraborate used as the crosslinking agent. The buffer concentration ranges from about 10 to about 20 lbs/1000 gals for example and the borate required ranges from about 5 to about 15 lbs/1000 gals depending on the amount of guar or hydroxypropyl guar in the base gel. These materials are available from chemical suppliers and service companies such as have been described herein.

Other crosslinkers which are used include salt solutions of transitional metals such as titanium, chromium, and zirconium. Several crosslinker systems using titanium in solution have been developed by DuPont. These include titanium chemically combined with triethanolamine (TYZOR TE) and acetylacetonate (TYZOR AA), as examples. Because of their flexibility and utility, hydroxypropyl guar crosslinked with titanium is a very common present-day fracturing fluid and is available from several service companies; these fluid systems are also known in the prior art. Although not developed to the extent of the titanium crosslinked gel systems, fluids crosslinked with zirconium and chromium are available through the service companies.

Titanium crosslinked gels are more shear and temperature stable than borate gel systems. The buffer system used for titanium crosslinked gel include sodium acetate, sodium bicarbonate, and organic acids. The buffer(s) are mixed into the base gel and the crosslinker is added as the fluid is pumped. Reaction of the crosslink can be controlled by fluid pH and type and concentration of crosslinker solution used.

The gel plug and solidified gel material within the fractures as described herein are especially advantageous since they will not "melt" or break down because the intense heat generated by the detonation of the high energy impulse device is localized. For this reason hydrochloric acid is used to chemically break down the gel plug and a concentration of about 15% by weight HCl in water is especially useful. This acid with necessary corrosion inhibitors, etc. is available from the service companies. The HCl solution is circulated down the wellbore using coiled tubing and nitrogen. It is often used with this operation to minimize the amount of fluid in contact with the zone of interest following the high energy impulse treatment.

When using propellants to generate the desired fracturing pressure, it is often desirable to produce a gel plug which will withstand temperatures from about 149° C. to about 232° C. (300° F. to 450° F.) for from about 0.5 of a day to about 4 days. A thermally stable solid gel plug is obtained by mixing into the pumpable gel mixture an oxygen scavenger chemical composition, for example sodium thiosulfate or a short chain alcohol or carbinol (such as methanol, ethanol, and isopropanol). However sodium thiosulfate is preferred. The conentration of the oxygen scavenger, of course, will depend upon the thermal stability desired to be obtained for the gel plug and the solidified gel within said fractures. Moreover, the preferred concentration of the oxygen scavenger chemical composition in the pumpable gel mixture is from about 0.10 percent by weight to about 0.75 percent by weight, most preferably 0.50 percent by weight, based on the total weight of the mixture.

Several different ways are provided for easy removal of the solid gel plug and the solid gel within the fractures. One variation, which can be utilized to facilitate removal of the gel plug from the wellbore and additional solid gel from the fractures is to form a solid gel containing a gel breaker. This gel breaker, included in the pumpable gel mixture, is selected from a group of chemical compounds which can break down the solid gel at temperatures of less than about 16° C. to about 121° C. (60° F. to 250° F.). Generally, this breakdown of the gel stem will occur within from about 2 hours to about 24 hours after solidification of the gel mixture in the well bore depending upon type and concentration of gel breaker added. Chemical compositions satisfactory for use as gel breakers, and which may be incorporated into the pumpable gel mixture, include certain enzymes and certain oxidizing agents (such as sodium persulfate) which are suitable for breaking down the solid gel. Other gel breakers are disclosed in U.S. Pat. No. 4,265,311 issued to Ely on May 5, 1981. This patent is hereby incorporated by reference. Enzyme breakers may be obtained commercially from oil field service companies.

The concentration of the gel breaker incorporated into the pumpable gel mixture may vary from about 0.01 weight percent to about 0.10 weight percent, preferably about 0.05 weight percent of the gel mixture. Although the temperature upon ignition in the wellbore may generally exceed about 66° C. (150° F.), the gel plug will remain intact during the generation and dissipation of energy after ignition of the propellant. Upon cooling to a temperature of from about 16° C. to 66° C. (60° F. to about 150° F.), a suitable gel breaker will break down the solid gel plug stem in the wellbore causing the plug and other solid gel materials to liquify.

Another method for breaking the gel according to the invention comprises contacting the solidified gel stem with a mineral acid after ignition of the propellant and lapse of a suitable time interval. In those instances where it is undesirable to have a gel breaker incorporated into the gel mixture prior to ignition to remove the solid gel plug, it is preferred to use hydrochloric acid of a strength sufficient to solubilize the solid gel. Hydrochloric acid, and acids similar thereto, can be used to break down the solid gel on contact. Hydrochloric acid of a concentration of about 5.0 percent to about 28 percent preferably about 15 percent, by volume of solution, will generally be sufficient for this purpose. Although hydrochloric acid has been mentioned, other similar mineral acids or strong organic acids may be used.

The following examples illustrate the invention.

EXAMPLE 1

According to the invention, a slurry is formed with 3785.4 liters (1,000 gallons) of water. This slurry comprises 18.4 Kg (40 pounds) of base gel, hydroxypropyl guar gum, which forms a hydrate in the water. To this mixture is added 272.1 Kg (600 pounds) of chemically treated hydroxypropyl guar gum which has delayed hydration or thickening qualities. Then, 9.2 Kg (20 pounds) of sodium pyrophosphate buffer which is suitable to obtain the desired pH and reaction time is added to this mixture. A cross-linking agent consisting of sodium tetra-borate is then added in an amount of 9.2 Kg (20 pounds). Nineteen and forty-seven one hundredths kilograms (42 pounds) of sodium thiosulfate, an oxygen scavenger, is then added to the mixture. This gel mixture is pumped into the wellbore and formation. After solidification of the mixture and ignition of the propellant, the cooled solid gel stem plug and solid gel within said fractures are liquefied after contacting the solid gel plug with aqueous hydrochloric acid in a concentration of about 7.5 to about 15 volume percent until the solid gel stem becomes solubilized and thereafter the solubilized gel is removed from the wellbore and fractures.

EXAMPLE 2

A slurry or mixture is made as above in Example 1 with 3785.41 liters (1,000 gallons) of water, and 18.4 Kg (40 pounds) of base gel including hydroxypropyl guar gum which forms a hydrate in water and 272.1 Kg (600 pounds) of chemically treated hydroxypropyl guar gum which has delayed hydration or thickening qualities. Additional components are placed into the gel mixture: namely, 190.47 Kg (420 pounds) of calcium carbonate is next added to the mixture. Next, a titanium solution with triethanol amine (DuPont's TYZOR TE), in an amount of about 1.81 Kg (4 pounds), is added to the mixture; finally, about 77.1 Kg (170 pounds) of potassium chloride is subsequently added to the mixture. One and eighty-one hundredths (4 pounds) of sodium persulfate is then added to the mixture and serves as a gel breaker. Upon solidification, the formed gel stem is capable of withstanding greater pressures upon ignition of the propellant. Upon cooling, after ignition of the propellant, the gel plug and solid gel are liquefied by the sodium persulfate gel breaker and is removed from the wellbore.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A method for fracturing a subterranean stratified formation penetrated by a well which extends downwardly through said formation comprising:
   (a) inducing more than two radial fractures simultaneously into the lower zone of said formation by high impulse fracturing which fracturing utilizes an ignitable propellant means;
   (b) placing a solidifiable gel material into said lower zone containing said multiple fractures;
   (c) causing said gel to solidify and fill said fractures while forming a gel plug in said well above said fractured zone which gel is sufficient to absorb energy resultant from subsequent fracturing in a higher zone;
   (d) inducing more than two radial fractures simultaneously in the zone above the zone previously fractured, thereafter placing a solidifiable gel material into the fractured zone, and causing said gel to solidify as in (c) above; and
   (e) repeating step (d) until all desired zones in said formation have been fractured.

2. The method as recited in claim 1 which comprises adding a solid non-reactant composition to the gel mixture in an amount sufficient to increase the density of the gel, whereby within a time of up to about 4 hours said gel mixture becomes a solid gel plug of sufficient density to withstand the energy released from said propellant means when ignited, at a temperature of up to greater than about 538° C. (1000° F.) and pressure of about 551,682 kPA (80,000 psig).

3. The method as recited in claim 1 wherein a solid non-reactant composition is added to said gel mixture and said composition is a member of the group consisting of sodium chloride and calcium carbonate which is added to said gel mixture in an amount sufficient to increase the density of said gel, whereby within a time of up to about 4 hours said gel becomes solid in said fractures while producing a gel plug of sufficient density to withstand the energy released from said propellant means when ignited, at a temperature of up to greater than about 538° C. (1000° F.) and a pressure of about 551,682 kPa (80,000 psig).

4. The method as recited in claim 1 wherein a gel breaker is added to the gel mixture in an amount sufficient to break down the solid gel stem formed in the wellbore at a temperature of up to about 121° C. (250° F.) within a time of up to 24 hours.

5. The method as recited in claim 1 wherein an oxygen scavenger is placed into said gel mixture, said oxygen scavenger is a member selected from the group consisting of sodium thiosulfate and a short chain alcohol.

6. The method as recited in claim 1 wherein an oxygen scavenger is included in said gel mixture in a concentration of from about 0.10 percent by weight to about 0.75 percent by weight of said mixture, where said oxygen scavenger is a member selected from the group consisting of sodium thiosulfate and a short chain alcohol.

7. The method as recited in claim 1 wherein said gel mixture includes a gel breaker capable of breaking down said solid gel plug where said gel breaker comprises an enzyme and/or an oxidizing agent.

8. The method as recited in claim 1 wherein hydrochloric acid in a concentration of from about 5 percent to about 28 percent by volume of solution is made to contact the solid gel and plug to break down said solid gel and plug to facilitate its removal from the wellbore.

9. The method as recited in claim 1 wherein said gel mixture comprises hydropropyl guar gum cross-linked with a transitional metal ion which is a member selected from the group consisting of titanium, zirconium, chromium, antimony and aluminum ions.

10. The method as recited in claim 1 wherein said gel mixture comprises hydropropyl guar gum cross-linked with a transitional metal ion which is a member selected from the group consisting of titanium, zirconium, chromium, antimony and aluminum ions which is included within said gel mixture in an amount of from about 0.005 weight percent to about 0.50 weight percent of said gel mixture.

11. A method for fracturing a hydrocarbonaceous subterranean stratified formation penetrated by a well which extends downwardly through said formation comprising:
   (a) inducing more than two radial fractures simultaneously into the lower zone of said formation by high impulse fracturing which fracturing utilizes an ignitable propellant means;
   (b) placing a solidifiable gel material into said lower zone containing said multiple fractures;
   (c) causing said gel to solidify and fill said fractures while forming a gel plug in said well above said fractured zone which gel is sufficient to absorb energy resultant from subsequent fracturing in a higher zone;
   (d) inducing more than two radial fractures simultaneously in the zone above the zone previously fractured, thereafter placing a solidifiable gel material into the fractured zone, and causing said gel to solidify as in (c) above; and
   (e) repeating step (d) until all desired zones in said formation have been fractured.

12. The method as recited in claim 11 which comprises adding a solid non-reactant composition to the gel mixture in an amount sufficient to increase the density of the gel, whereby within a time of up to about 4 hours said gel mixture becomes a solid gel plug of sufficient density to withstand the energy released from said propellant means when ignited, at a temperature of up to greater than about 538° C. (1000° F.) and pressure of about 551,682 kPa (80,000 psig).

13. The method as recited in claim 11 wherein a solid non-reactant composition is added to said gel mixture and said composition is a member of the group consisting of sodium chloride and calcium carbonate which is added to said gel mixture in an amount sufficient to increase the density of said gel, whereby within a time of up to about 4 hours said gel becomes solid in said fractures while producing a gel plug of sufficient density to withstand the energy released from said propellant means when ignited, at a temperature of up to greater than about 538° C. (1000° F.) and a pressure of about 551,682 kPa (80,000 psig).

14. The method as recited in claim 11 wherein a gel breaker is added to the gel mixture in an amount sufficient to break down the solid gel stem formed in the wellbore at a temperature of up to about 121° C. (250° F.) within a time of up to 24 hours.

15. The method as recited in claim 11 wherein an oxygen scavenger is placed into said gel mixture, said oxygen scavenger is a member selected from the group consisting of sodium thiosulfate and a short chain alcohol.

16. The method as recited in claim 11 wherein an oxygen scavenger is included in said gel mixture in a concentration of from about 0.10 percent by weight to about 0.75 percent by weight of said mixture, where said oxygen scavenger is a member selected from the group consisting of sodium thiosulfate and a short chain alcohol.

17. The method as recited in claim 11 wherein said gel mixture includes a gel breaker capable of breaking down said solid gel plug where said gel breaker comprises an enzyme and/or an oxidizing agent.

18. The method as recited in claim 11 wherein hydrochloric acid in a concentration of from about 5 percent to about 28 percent by volume of solution is made to contact the solid gel and plug to break down said solid gel and plug to facilitate its removal from the wellbore.

19. The method as recited in claim 11 wherein said gel mixture comprises hydropropyl guar gum crosslinked with a transitional metal ion which is a member selected from the group consisting of titanium, zirconium, chromium, antimony and aluminum ions.

20. The method as recited in claim 11 wherein said gel mixture comprises hydropropyl guar gum crosslinked with a transitional metal ion which is a member selected from the group consisting of titanium, zirconium, chromium, antimony and aluminum ions which is included within said gel mixture in an amount of from about 0.005 weight percent to about 0.50 weight percent of said gel mixture.

21. A method for fracturing a hydrocarbonaceous subterranean stratified formation penetrated by a well which extends downwardly through said formation comprising:
(a) inducing more than two radial fractures simultaneously into the lower zone of said formation by high impulse fracturing which fracturing utilizes an ignitable propellant means;
(b) placing a solidifiable gel material into said lower zone containing said multiple fractures;
(c) causing said gel to solidify and fill said fractures while forming a gel plug in said well above said fractured zone which gel is sufficient to absorb energy resultant from subsequent fracturing in a higher zone;
(d) inducing more than two radial fractures simultaneously in the zone above the zone previously fractured, thereafter placing a solidifiable gel material into the fractured zone, and causing said gel to solidify as in (c) above;
(e) repeating step (d) until all desired zones in said formation have been fractured; and
(f) removing said solidified gel and producing a hydrocarbonaceous fluid from said well.

22. The method as recited in claim 21 which comprises adding a solid non-reactant composition to the gel mixture in an amount sufficient to increase the density of the gel, whereby within a time of up to about 4 hours said gel mixture becomes a solid gel plug of sufficient density to withstand the energy released from said propellant means when ignited, at a temperature of up to greater than about 538° C. (1000° F.) and pressure of about 551,682 kPa (80,000 psig).

23. The method as recited in claim 21 wherein a solid non-reactant composition is added to said gel mixture and said composition is a member of the group consisting of sodium chloride and calcium carbonate which is added to said gel mixture in an amount sufficient to increase the density of said gel, whereby within a time of up to about 4 hours said gel becomes solid in said fractures while producing a gel plug of sufficient density to withstand the energy released from said propellant means when ignited, at a temperature of up to greater than about 538° C. (1000° F.) and a pressure of about 551,682 kPa (80,000 psig).

24. The method as recited in claim 21 wherein a gel breaker is added to the gel mixture in an amount sufficient to break down the solid gel stem formed in the wellbore at a temperature of up to about 121° C. (250° F.) within a time of up to 24 hours.

25. The method as recited in claim 21 wherein an oxygen scavenger is placed into said gel mixture, said oxygen scavenger is a member selected from the group consisting of sodium thiosulfate and a short chain alcohol.

26. The method as recited in claim 21 wherein an oxygen scavenger is included in said gel mixture in a concentration of from about 0.10 percent by weight to about 0.75 percent by weight of said mixture, where said oxygen scavenger is a member selected from the group consisting of sodium thiosulfate and a short chain alcohol.

27. The method as recited in claim 21 wherein said gel mixture includes a gel breaker capable of breaking down said solid gel plug where said gel breaker comprises an enzyme and/or an oxidizing agent.

28. The method as recited in claim 21 wherein hydrochloric acid in a concentration of from about 5 percent to about 28 percent by volume of solution is made to contact the solid gel and plug to break down said solid gel and plug to facilitate its removal from the wellbore.

29. The method as recited in claim 21 wherein said gel mixture comprises hydropropyl guar gum crosslinked with a transitional metal ion which is a member selected from the group consisting of titanium, zirconium, chromium, antimony and aluminum ions.

30. The method as recited in claim 21 wherein said gel mixture comprises hydropropyl guar gum crosslinked with a transitional metal ion which is a member selected from the group consisting of titanium, zirconium, chromium, antimony and aluminum ions which is included within said gel mixture in an amount of from about 0.005 weight percent to about 0.50 weight percent of said gel mixture.

* * * * *

UNITED STATES PATENT AND TRADEMARK OFFICE
CERTIFICATE OF CORRECTION

PATENT NO. : 4,750,562
DATED : June 14, 1988
INVENTOR(S) : Alfred R. Jennings, Jr.

It is certified that error appears in the above-identified patent and that said Letters Patent is hereby corrected as shown below:

Column 1, line 51, "sloidifies" should read --solidifies--.

Column 2, line 9, "individual" should read --individualized--.

Column 3, line 51, after "non-reacting" delete "solid".

Column 4, line 43, "availabe" should read --available--.

Signed and Sealed this

Sixth Day of December, 1988

Attest:

DONALD J. QUIGG

*Attesting Officer*          *Commissioner of Patents and Trademarks*